(12) United States Patent
Lee et al.

(10) Patent No.: US 11,526,244 B2
(45) Date of Patent: Dec. 13, 2022

(54) TOUCH SCREEN PANEL AND DISPLAY APPARATUS WITH INTEGRATED TOUCH SCREEN

(71) Applicant: LG Display Co., Ltd., Seoul (KR)

(72) Inventors: JaeWon Lee, Goyang-si (KR); SangHoon Pak, Seoul (KR); Sangheun Lee, Seoul (KR); Yuna Lee, Suwon-si (KR); Sulki Kim, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/115,521

(22) Filed: Dec. 8, 2020

(65) Prior Publication Data
US 2021/0117043 A1 Apr. 22, 2021

Related U.S. Application Data

(63) Continuation of application No. 16/022,347, filed on Jun. 28, 2018, now Pat. No. 10,901,567.

(30) Foreign Application Priority Data

Jun. 30, 2017 (KR) .......................... 10-2017-0083024

(51) Int. Cl.
*G06F 3/044* (2006.01)
*G06F 3/041* (2006.01)
*G06F 3/047* (2006.01)

(52) U.S. Cl.
CPC ............ *G06F 3/0445* (2019.05); *G06F 3/044* (2013.01); *G06F 3/047* (2013.01); *G06F 3/0412* (2013.01);
(Continued)

(58) Field of Classification Search
CPC ...................................................... G06F 3/0445
See application file for complete search history.

(56) References Cited

U.S. PATENT DOCUMENTS 9,239,654 B2   1/2016   Jang
9,454,027 B2   9/2016   Lee et al.
(Continued)

FOREIGN PATENT DOCUMENTS

CN   102171633 A   8/2011
CN   104111748 A   10/2014
(Continued)

OTHER PUBLICATIONS

Korean Office Action dated Apr. 28, 2021 issued in corresponding Patent Application No. 10-2017-0083024 (5 pages).
(Continued)

*Primary Examiner* — Fred Tzeng
(74) *Attorney, Agent, or Firm* — Polsinelli PC

(57) ABSTRACT

Disclosed are a touch screen panel and a display apparatus with integrated touch screen, in which a pattern inspection process and a repair process are easily performed on touch electrodes. The touch screen panel includes a plurality of first touch electrodes, a plurality of second touch electrodes spaced apart from the plurality of first touch electrodes, a plurality of bridge electrodes electrically connecting the plurality of second touch electrodes, and a plurality of identification patterns disposed in respective outer portions of the plurality of first touch electrodes and the plurality of second touch electrodes.

12 Claims, 4 Drawing Sheets

(52) U.S. Cl.
CPC .. *G06F 3/0446* (2019.05); *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 9,626,063 | B2 | 4/2017 | Choi |
| 10,901,567 | B2* | 1/2021 | Lee ........................ G06F 3/0443 |
| 2010/0045625 | A1 | 2/2010 | Yang et al. |
| 2010/0171718 | A1 | 7/2010 | Denda |
| 2010/0233930 | A1 | 9/2010 | Ishida et al. |
| 2011/0134055 | A1 | 6/2011 | Jung et al. |
| 2011/0304564 | A1 | 12/2011 | Kim et al. |
| 2014/0111709 | A1 | 4/2014 | Kim et al. |
| 2014/0333328 | A1* | 11/2014 | Nelson .................... G06F 3/041 |
| | | | 324/663 |
| 2014/0347319 | A1* | 11/2014 | Lin ........................ G06F 3/0445 |
| | | | 345/174 |
| 2015/0188538 | A1 | 7/2015 | Huh et al. |
| 2016/0231861 | A1 | 8/2016 | Nagata et al. |
| 2017/0147848 | A1* | 5/2017 | Lin ........................ G06F 3/0445 |
| 2017/0168336 | A1 | 6/2017 | Hwang et al. |
| 2017/0212629 | A1 | 7/2017 | Cho et al. |
| 2017/0228069 | A1 | 8/2017 | Xie et al. |
| 2017/0315657 | A1 | 11/2017 | Lai et al. |
| 2017/0344162 | A1 | 11/2017 | Lee et al. |
| 2018/0025203 | A1* | 1/2018 | Lee ........................ G06F 3/0443 |
| | | | 382/124 |
| 2018/0088712 | A1* | 3/2018 | Kim .................... G02F 1/13338 |
| 2018/0188582 | A1 | 7/2018 | Teng et al. |
| 2018/0196984 | A1* | 7/2018 | Ahn .................... G06V 40/1365 |
| 2018/0329530 | A1 | 11/2018 | Yu et al. |
| 2018/0348902 | A1 | 12/2018 | Zhang et al. |
| 2019/0212840 | A1* | 7/2019 | Zhang ................ G06V 40/1306 |

FOREIGN PATENT DOCUMENTS

| | | |
|---|---|---|
| KR | 10-2013-0118072 A | 10/2013 |
| KR | 10-2015-0136684 A | 12/2015 |
| KR | 10-2016-0026170 A | 3/2016 |

OTHER PUBLICATIONS

Chinese Office Action dated Jul. 16, 2021 issued in Patent Application No. 201810722356.4 w/English Translation (10 pages).
Counterpart Chinese Office Action dated Jan. 12, 2021 issued in Chinese Patent Application No. 201810722356.4 with English translation (21 pages).

* cited by examiner

TOUCH SCREEN PANEL AND DISPLAY APPARATUS WITH INTEGRATED TOUCH SCREEN

CROSS REFERENCE TO RELATED APPLICATIONS

This application is a continuation of U.S. application Ser. No. 16/022,347, filed on Jun. 28, 2018, which claims the benefit of the Korean Patent Application No. 10-2017-0083024 filed on Jun. 30, 2017, of which the full disclosures of these applications are incorporated herein by reference for all purposes.

BACKGROUND

Field of the Disclosure

The present disclosure relates to a display device, and more particularly, to a touch screen panel and a display apparatus with integrated touch screen. Although the present disclosure is suitable for a wide scope of applications, it is particularly suitable for facilitating a pattern inspection process and a repair process on a touch electrode of a touch screen panel and a display apparatus with integrated touch screen.

Description of the Background

Touch screen panels are a type of input device which is installed in a display apparatus and enables a user to input information by touching a display screen with a finger, a pen, or the like while looking at the display screen.

Recently, organic light emitting display apparatuses are implemented as display apparatuses with integrated touch screen including a touch screen panel, and thus, function as touch screen apparatuses.

In display apparatuses with integrated touch screen, a touch screen panel includes a plurality of first touch electrodes, a plurality of second touch electrodes, and a plurality of bridge electrodes for connecting the first touch electrodes or the second touch electrodes. Here, each of the first touch electrodes may be a driving electrode, and each of the second touch electrodes may be a receiving electrode. The first touch electrodes and the second touch electrodes are provided on the same layer, and the bridge electrodes are provided on a layer which differs from the first touch electrodes and the second touch electrodes. The touch screen panel generates touch information, based on a capacitance variation between a first touch electrode and a second touch electrode.

A capacitive touch screen panel is disposed on a display panel, and thus, uses a transparent electrode material, such as indium tin oxide (ITO), as a touch electrode. However, the transparent electrode material has a relatively high sheet resistance, causing a reduction in touch sensitivity. Therefore, instead of the transparent electrode material, a touch electrode having a metal mesh structure has been proposed recently.

Since touch electrodes having the metal mesh structure have a mesh type, a pattern defect such as short circuit between adjacent touch electrodes can occur, and in a process of inspecting the pattern defect, the occurrence or not of a defect is checked through inspection and repair inspection and the checked defect can be repaired. However, in inspection and repair inspection processes, since the touch electrodes having the metal mesh structure are formed of the same material and the metal mesh structure is complicated, much time is taken in finding a defective position, causing a reduction in productivity.

SUMMARY

Accordingly, the present disclosure is directed to provide a touch screen panel and a display apparatus with integrated touch screen that substantially obviate one or more problems due to limitations and disadvantages of the related art.

An aspect of the present disclosure is directed to provide a touch screen panel and a display apparatus with integrated touch screen, in which a pattern inspection process and a repair process are easily performed on touch electrodes.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a touch screen panel including a plurality of first touch electrodes, a plurality of second touch electrodes spaced apart from the plurality of first touch electrodes, a plurality of bridge electrodes electrically connecting the plurality of second touch electrodes, and a plurality of identification patterns disposed in respective outer portions of the plurality of first touch electrodes and the plurality of second touch electrodes.

The plurality of identification patterns may be disposed on the same layer as the plurality of bridge electrodes.

Each of the plurality of first touch electrodes and the plurality of second touch electrodes may include a plurality of metal lines and has a mesh pattern structure where the plurality of metal lines intersect one another, and each of the plurality of identification patterns may be at least one protrusion or concave portion provided on one side surface of a metal line disposed in an outer portion of each of the plurality of first touch electrodes and the plurality of second touch electrodes.

In another aspect of the present disclosure, there is provided a display apparatus with integrated touch screen, the display apparatus including a light emitting device layer including a first electrode connected to a thin film transistor (TFT) layer provided on a substrate, a light emitting layer provided on the first electrode, and a second electrode provided on the light emitting layer, an encapsulation layer surrounding the light emitting device layer, and a touch electrode layer provided on the encapsulation layer, wherein the touch electrode layer includes a plurality of first touch electrodes, a plurality of second touch electrodes spaced apart from the plurality of first touch electrodes, a plurality of bridge electrodes electrically connecting the plurality of second touch electrodes, and a plurality of identification patterns disposed in respective outer portions of the plurality of first touch electrodes and the plurality of second touch electrodes.

In a further aspect of the present disclosure, a touch screen panel comprises a plurality of first touch electrodes, a plurality of second touch electrodes spaced apart from the plurality of first touch electrodes, a sensing area disposed between the plurality of first touch electrodes and the plurality of the second electrode and having a metal mesh structure, a plurality of bridge electrodes electrically connecting the plurality of second touch electrodes, and a plurality of identification patterns disposed in an outer portion of each of the plurality of first touch electrodes and the plurality of second touch electrodes to identify the sensing area.

The light emitting device layer may further include a bank covering an edge of the first electrode to define an opening area on the first electrode, the plurality of first touch electrodes and the plurality of second touch electrodes may overlap the bank, and some of the plurality of identification patterns may overlap the opening area.

The display apparatus with integrated touch screen may further include a plurality of dummy patterns provided on the same layer as the plurality of bridge electrodes to overlap the plurality of first touch electrodes and the plurality of second touch electrodes. Here, the plurality of dummy patterns may include a plurality of metal lines and may have a mesh pattern structure where the plurality of metal lines intersect one another.

The plurality of bridge electrodes, the plurality of identification patterns, and the plurality of dummy patterns may each have a three-layer structure of titanium/aluminum/titanium or molybdenum/aluminum/molybdenum.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
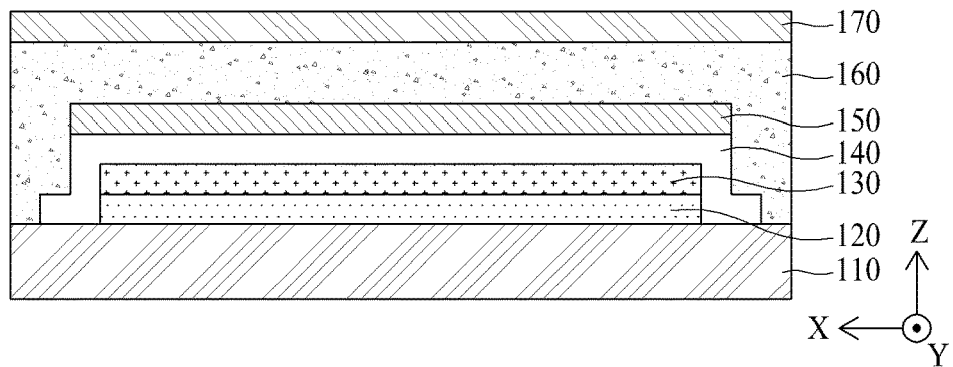
FIG. 1 is a cross-sectional view schematically illustrating a display apparatus with integrated touch screen according to an aspect of the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, exemplary aspects of a touch screen panel and a display apparatus with integrated touch screen according to the present disclosure will be described in detail with reference to the accompanying drawings. In the specification, in adding reference numerals for elements in each drawing, it should be noted that like reference numerals already used to denote like elements in other drawings are used for elements wherever possible.

FIG. 1 is a cross-sectional view schematically illustrating a display apparatus with integrated touch screen according to an aspect of the present disclosure.

Referring to FIG. 1, the display apparatus with integrated touch screen according to an aspect of the present disclosure may include a first substrate 110, a thin film transistor (TFT) layer 120, a light emitting device layer 130, an encapsulation layer 140, a touch electrode layer 150, an adhesive layer 160, and a second substrate 170.

The first substrate 110 may be a base substrate and may include a plastic material, a glass material, and/or the like. Here, if the first substrate 110 includes a plastic material, the first substrate 110 may include opaque or colored polyimide. For example, the first substrate 110 including polyimide may be formed by curing a polyimide resin which is coated to have a certain thickness on the front surface of a release layer disposed on a carrier substrate which is relatively thick. Optionally, the carrier substrate may be separated from the first substrate 110 by releasing the release layer through a laser releasing process.

Additionally, if the first substrate 110 includes a plastic material, the display apparatus according to the present aspect may further include a back plate coupled to the rear surface of the first substrate 110 with respect to a thickness direction (a Z-axis direction) of the first substrate 110. The back plate may maintain the first substrate 110 in a plane state. According to an aspect, the back plate may include a plastic material, polyethylene terephthalate (PET), and/or the like. The back plate may be laminated on the rear surface of the first substrate 110 separated from the carrier substrate.

The TFT layer 120 may be disposed on the first substrate 110 and may include a plurality of scan lines, a plurality of data lines, and a plurality of TFTs. Each of the TFTs may include a gate electrode, a semiconductor layer, a source electrode, and a drain electrode. The TFT layer 120 will be described below in detail with reference to FIG. 4.

Additionally, the display apparatus according to the present aspect may further include a scan driving circuit provided in a non-display area of the first substrate 110. The scan driving circuit may generate a scan pulse according to a scan control signal and may supply the scan pulse to a corresponding scan line in a predetermined order. The scan driving circuit according to an aspect may be provided in the non-display area of the first substrate 110 along with the TFTs.

The light emitting device layer 130 may be provided on the TFT layer 120. According to an aspect, the light emitting device layer 130 may include a first electrode, a light emitting layer, a second electrode and a bank. A plurality of pixels may be provided in an area where the light emitting device layer 130 is provided, and thus, the area where the light emitting device layer 130 is provided may be referred to as a display area. An area around and outside the display area may be referred to as a non-display area. The light emitting device layer 130 may emit light according to a data signal supplied from a TFT of the TFT layer 120 through the first electrode. At this time, light emitted from the light emitting device layer 130 may be extracted toward the second substrate 170. The light emitting device layer 130 will be described below in detail with reference to FIG. 4.

According to an aspect, the plurality of pixels may be arranged in a stripe structure in the display area. In this case, each of the plurality of pixels may include a red subpixel, a green subpixel, and a blue subpixel, and moreover, may further include a white subpixel.

According to another aspect of the disclosure, the plurality of pixels may be arranged in a pentile structure in the display area. In this case, each of the plurality of pixels may include one red subpixel, two green subpixels, and one blue subpixel, which are planarly arranged as a polygonal type. For example, each of the pixels having the pentile structure may include one red subpixel, two green subpixels, and one blue subpixel, which are planarly arranged as an octagonal type. In this case, the blue subpixel may have a largest size, and each of the two green subpixels may have a smallest size.

The encapsulation layer 140 may be provided on the first substrate 110 to surround the light emitting device layer 130. The encapsulation layer 140 protects the light emitting device layer 130 and the like from an external impact and prevents oxygen or water from penetrating into the light emitting device layer 130. The encapsulation layer 140 may include at least one inorganic layer.

The touch electrode layer 150 may be provided on the encapsulation layer 140. The touch electrode layer 150 according to an aspect of the disclosure may include a plurality of first touch electrodes, a plurality of second touch electrodes, a plurality of bridge electrode, and a plurality of identification patterns, for sensing a touch position of the display apparatus touched by a touch object. Here, each of the first and second touch electrodes and the bridge electrodes may have a metal mesh structure. Also, each of the identification patterns may be provided outside the first and second touch electrodes and may be exposed at a gap space between first and second touch electrodes adjacent thereto. The touch electrode layer 150 will be described below in detail with reference to FIG. 4.

The adhesive layer 160 may be provided on the touch electrode layer 150. The adhesive layer 160 may attach the second substrate 170 on the front surface of the first substrate 110 on which the TFT layer 120, the light emitting device layer 130, the encapsulation layer 140, and the touch electrode layer 150 are provided. The adhesive layer 160 may be an optically clear resin (OCR) layer, an optically clear adhesive (OCA) film, or the like.

The second substrate 170 may act as a cover substrate or a cover window, which covers the first substrate 110. The second substrate 170 may be a plastic film, a glass substrate, an encapsulation film (a protective film), or the like.

As described above, according to an aspect of the present disclosure, since the touch electrode layer 150 for sensing a touch position of the display apparatus touched by a touch object is directly located on the front surface of the encapsulation layer 140, a process of attaching a touch screen panel on a screen of the display apparatus by using an adhesive member is not separately needed. Also, according to an aspect of the present disclosure, since the identification patterns are provided on the touch electrode layer 150, a sensing area between the first touch electrode and the second electrode having the metal mesh structure is easily identified by the identification pattern during an inspection process and a repair inspection process, and thus, the inspection and repair inspection processes can be easily performed, thereby increasing productivity.

Figure 2:
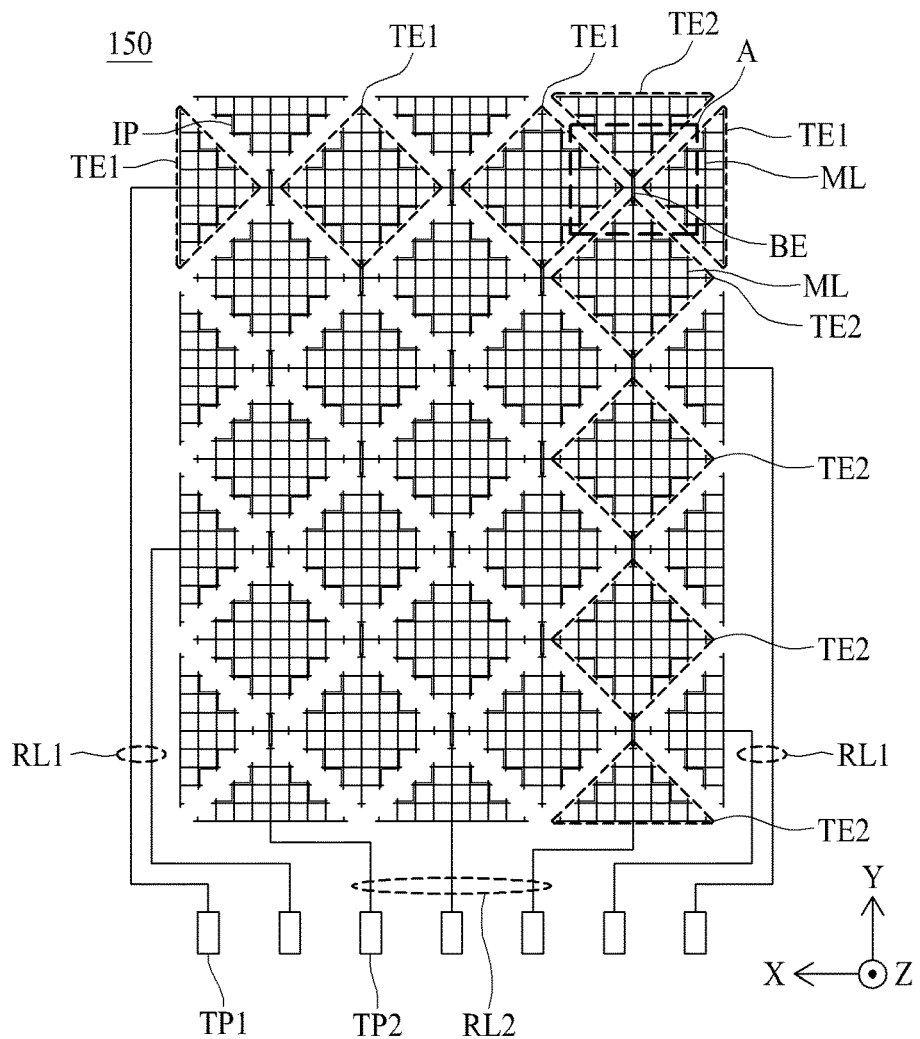
FIG. 2 is a plan view for describing a structure of a touch electrode layer in a display apparatus with integrated touch screen according to an aspect of the present disclosure.
Figure 3:
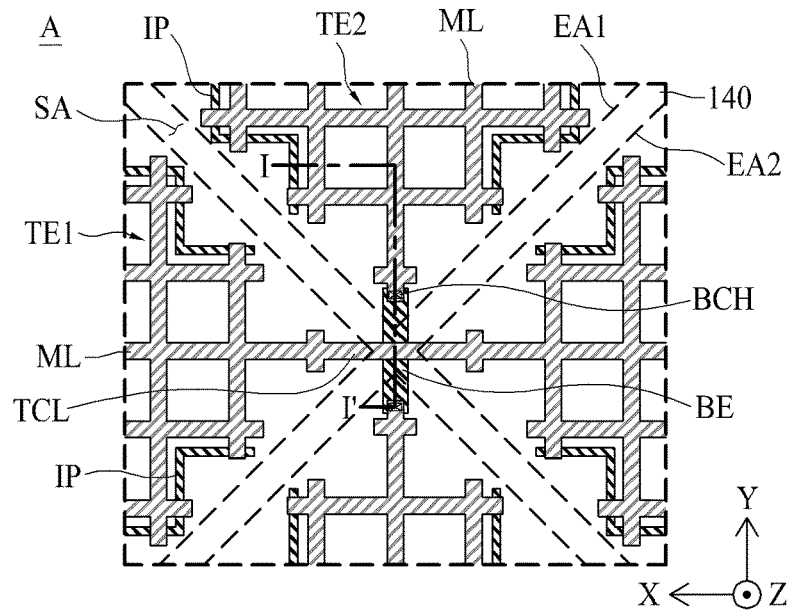
FIG. 3 is an enlarged view of a portion A illustrated in FIG. 2.

FIG. 2 is a plan view for describing a structure of a touch electrode layer 150 in a display apparatus with integrated touch screen according to an aspect of the present disclosure, and FIG. 3 is an enlarged view of a portion A illustrated in FIG. 2.

Referring to FIGS. 2 and 3, the touch electrode layer 150 according to an aspect of the present disclosure may include a plurality of first touch electrodes TE1, a plurality of second touch electrodes TE2, a plurality of bridge electrodes BE, and a plurality of identification patterns IP.

The first touch electrodes TE1 may be arranged at certain intervals along a first direction (an X-axis direction). The first touch electrodes TE1 may have a metal mesh structure.

The second touch electrodes TE2 may be arranged at certain intervals along a second direction (a Y-axis direction) in order for each of the second touch electrodes TE2 to be provided between adjacent first touch electrodes TEL The second touch electrodes TE2 may have the metal mesh structure.

The first touch electrodes TE1 and the second touch electrodes TE2 may each include a mesh pattern where a plurality of metal lines ML having a very thin line width intersect one another. The mesh pattern according to an aspect of the disclosure may have a single-layer structure or a multilayer structure including a metal material such as molybdenum (Mo), silver (Ag), titanium (Ti), copper (Cu), aluminum (Al), Ti/Al/Ti, and Mo/Al/Mo.

The first direction may be a direction parallel to the scan lines provided on the TFT layer 120, and the second direction may be a direction parallel to the data lines provided on the TFT layer 120. On the other hand, the first direction may be a direction parallel to the data lines, and the second direction may be a direction parallel to the scan lines.

The first touch electrodes TE1 and the second touch electrodes TE2 may be simultaneously formed through a process of forming the metal lines ML which have a mesh type and intersect one another on the encapsulation layer 140 and a cutting process of cutting the metal lines ML, provided in a sensing area SA between first and second touch electrode areas EA1 and EA2 previously provided on the encapsulation layer 140, to separate the metal lines ML into the first touch electrodes TE1 and the second touch electrodes TE2.

The first touch electrodes TE1 and the second touch electrodes TE2 may each have a mesh pattern structure and may have a polygonal shape, for example, a lozenge shape. In this case, the first touch electrodes TE1 and the second touch electrodes TE2 arranged in a corner of the touch electrode layer 150 may each have a triangular shape.

In the present disclosure, a touch may be sensed by using a mutual capacitance between the first touch electrode TE1 and the second touch electrode TE2, and the mutual capacitance may be mainly generated in an outer portion of each of the first touch electrode TE1 and the second touch electrode TE2 adjacent to the sensing area SA. Therefore, in the present disclosure, a cutting part of each of the metal lines ML disposed in the outer portion of each of the first touch electrode TE1 and the second touch electrode TE2 may be provided as a projection type, and thus, an area (or a length) of the outer portion of each of the first touch electrode TE1 and the second touch electrode TE2 may be enlarged, thereby increasing the mutual capacitance generated in the sensing area SA between the first touch electrode TE1 and the second touch electrode TE2. Accordingly, touch sensing sensitivity can be enhanced.

First touch electrodes TE1 arranged in the first direction may be electrically connected to each other through at least one middle metal line ML without being electrically disconnected from each other, and the middle metal line ML of the first touch electrodes TE1 may be defined as a first touch electrode connection line TCL. In this case, the first touch electrodes TE1 connected to each other in the first direction may be spaced apart from and may be electrically disconnected (or insulated) from first touch electrodes TE1 adjacent to one another in the second direction.

Second touch electrodes TE2 arranged in the second direction may be electrically disconnected from each other near the first touch electrode connection line TCL of the first touch electrodes TEL In this case, the second touch electrodes TE2 connected to each other in the second direction may be spaced apart from and may be electrically disconnected from second touch electrodes TE2 adjacent to one another in the first direction.

In order to prevent the first touch electrodes TE2 and the second touch electrodes TE2 from being short-circuited with one another in an intersection area therebetween, the second touch electrodes TE2 adjacent to each other in the second direction may be electrically connected to each other through a corresponding bridge electrode BE.

The bridge electrode BE may be electrically connected to the adjacent second touch electrodes TE2 through a bridge contact hole BCH in an intersection area. The bridge electrode BE may intersect the first touch electrode connection line TCL of the first touch electrodes TEL The bridge electrode BE may be provided in a rectilinear shape, but is not limited thereto. In other aspects of the disclosure, the bridge electrode BE may have various shapes such as a curve shape, a cramp shape, and a mesh shape for connecting the second touch electrodes TE2 adjacent to one another in the second direction.

First touch electrodes TE1, disposed on one side, of first touch electrodes TE1 connected to one another in the first direction may be connected to a first touch routing line RL1, and the first touch routing line RL1 may be connected to a touch driver through a first pad TP1 of a touch pad part. Therefore, the first touch electrodes TE1 connected to one another in the first direction may receive a touch driving signal from the touch driver through the first touch routing line RL1.

Second touch electrodes TE2, disposed on one side, of second touch electrodes TE2 connected to one another through a corresponding bridge electrode BE in the second direction may be connected to a second touch routing line RL2, and the second touch routing line RL2 may be connected to the touch driver through a second pad TP2 of the touch pad part. Therefore, the touch driver may receive a signal based on a capacitance variation of the sensing area through the second touch electrodes TE2 connected to one another in the second direction and may generate touch raw data corresponding to the received capacitance variation to supply the touch raw data to a touch controller. Also, the touch controller may generate touch coordinate data based on the touch raw data and may supply the touch coordinate data to a host system, and the host system may execute an application program associated with touch coordinates corresponding to the touch coordinate data.

The bridge electrode BE may be provided on or under the first touch electrodes TE1 or the second touch electrodes TE2 with an insulation layer therebetween. For example, the touch electrode layer 150 may include a first electrode layer including the bridge electrode BE, the insulation layer on the first electrode layer, and a second electrode layer including the first touch electrodes TE1 and the second touch electrodes TE2. As another example, the touch electrode layer 150 may include a first electrode layer including the first touch electrodes TE1 and the second touch electrodes TE2, the insulation layer on the first electrode layer, and a second electrode layer including the bridge electrode BE.

The first touch electrodes TE, the second touch electrodes TE2, and the bridge electrode BE may each include an opaque metal line ML, and thus, light irradiated from a pixel onto the second substrate may be blocked by the metal line ML. Therefore, the metal line ML of each of the first touch electrodes TE1, the second touch electrodes TE2, and the bridge electrode BE may be provided not to overlap an opening area of the pixel, so as to prevent a luminance of an image displayed by the pixel from being reduced. For example, the metal line ML of each of the first touch electrodes TE1, the second touch electrodes TE2, and the bridge electrode BE may be provided to overlap a bank provided in the display area.

The identification patterns IP may act as an inspection reference guide pattern provided on the touch electrode layer 150. That is, the identification patterns IP may be clearly divided by boundary portions between the first touch electrodes TE1 and the second touch electrodes TE2 having the metal mesh structure, and thus, in an inspection and repair inspection process performed on the touch electrode layer 150, the boundary portions between the first touch electrodes TE1 and the second touch electrodes TE2 having the metal mesh structure which is complicated and the sensing area SA are easily checked or identified.

The identification patterns IP according to an aspect of the disclosure may be provided outside the first touch electrodes TE1 and the second touch electrodes TE2 adjacent to the sensing area SA. In this case, the identification patterns IP may each be formed of an opaque metal material, and the sensing area SA may overlap the opening area of the pixel, whereby light traveling from the pixel to the sensing area SA may be blocked by the identification patterns IP. Therefore, the identification patterns IP according to an aspect of the disclosure may be provided on the bank at respective positions closest to outer portions of the first touch electrodes TE1 and the second touch electrodes TE2 so as to minimize an overlap area where the identification patterns IP overlap the sensing area SA, and a partial region of each of the identification patterns IP may overlap or intersect the metal line ML in a corresponding outer portion of the outer portions of the first touch electrodes TE1 and the second touch electrodes TE2. Also, some of the identification patterns IP may overlap the opening area so as to be identified in the inspection and repair inspection process performed on the touch electrode layer 150.

The identification patterns IP may be provided in a line shape or a stepped shape along outer portions of the first and second touch electrodes TE1 and TE2 adjacent to the sensing area SA. The identification patterns IP provided adjacent to the first and second touch electrodes TE1 and TE2 may have a symmetrical structure with the sensing area SA therebetween. A line width of each of the identification patterns IP may be narrower than the metal line ML of each of the first and second touch electrodes TE1 and TE2 so as to minimize an overlap area where the identification patterns IP overlap the sensing area SA.

The identification patterns IP may be electrically insulated from the first and second touch electrodes TE1 and TE2 and the bridge electrode BE. The identification patterns IP may be electrically insulated from the bridge electrode BE and may be provided on the same layer as the bridge electrode BE. That is, the identification patterns IP may be formed of the same material as that of the bridge electrode BE along with the bridge electrode BE. Therefore, in the present disclosure, since the bridge electrode BE and the identification patterns IP are formed of the same material through the same process, the identification patterns IP may be formed by merely changing a structure of a mask for forming the bridge electrode BE, without a separate additional process of forming the identification patterns IP. The identification patterns IP may not electrically be connected to the first and second touch electrodes TE1 and TE2 and the bridge electrode BE and may be electrically floated.

Additionally, the identification patterns IP according to the present disclosure is not limited to a line shape which is provided along the outer portions of the first and second touch electrodes TE1 and TE2, and may have various shapes such as a dot line shape and a curve shape where a portion of the sensing area SA is exposed, so as to be identified in the sensing area SA with an inspection apparatus. Here, the identification patterns IP having the dot line shape may be provided not to overlap or intersect the metal line ML disposed in each of the outer portions of the first and second touch electrodes TE1 and TE2. Also, in FIG. 3, it is illustrated that the identification patterns IP are spaced apart from the metal line ML of each of the first and second touch electrodes TE1 and TE2, but the aspect of the disclosure is not limited thereto. In other aspects, some of the identification patterns IP may be exposed at the sensing area SA so as to be identified in the sensing area SA with the inspection apparatus, and the other identification patterns IP may be provided to overlap the metal line ML of each of the first and second touch electrodes TE1 and TE2. In this case, the line width of each of the identification patterns IP may be equal to or wider than the metal line ML of each of the first and second touch electrodes TE1 and TE2.

In an aspect of the present disclosure, since the identification patterns IP are provided in the outer portions of the first and second touch electrodes TE1 and TE2 adjacent to the sensing area SA, the boundary portions between the first touch electrodes TE1 and the second touch electrodes TE2 having the metal mesh structure which is complicated and the sensing area SA are easily identified. At this time, in the inspection and repair inspection process performed on the touch electrode layer 150, colors of the identification patterns IP clearly distinguished from colors of the first and second touch electrodes TE1 and TE2 may be recognized in an inspection image obtained by an imaging device, and thus, a position of each of the boundary portions between the first touch electrodes TE1 and the second touch electrodes TE2 having the metal mesh structure which is complicated and a position of the sensing area SA may be checked. Subsequently, a short circuit defect in the sensing area SA may be inspected based on the colors of the identification patterns IP, and a portion where the short circuit defect occurs may be repaired. In the inspection and repair inspection process performed on the touch electrode layer 150, the position of the sensing area SA is immediately found based on the colors of the identification patterns IP, and thus, a process time is considerably shortened. In the inspection image, for example, the colors of the first and second touch electrodes TE1 and TE2 may be white color, and the colors of the identification patterns IP may be gray color. However, the aspect of the disclosure is not limited thereto, and the colors may be changed based on a layer structure of the touch electrode layer 150, materials of the touch electrodes, and materials of the identification patterns.

As described above, according to an aspect of the present disclosure, since the touch electrode layer 150 for sensing a touch position of the display apparatus touched by a touch object is directly provided on a front surface of the encapsulation layer 140, a process of attaching a touch screen panel on a screen of the display apparatus by using an adhesive member is not separately needed. Also, according to an aspect of the present disclosure, since the identification patterns IP are provided on the touch electrode layer 150, a pattern inspection and repair process is easily performed on the touch electrodes having the complicated metal mesh structure, based on the identification pattern IP.

Figure 4:
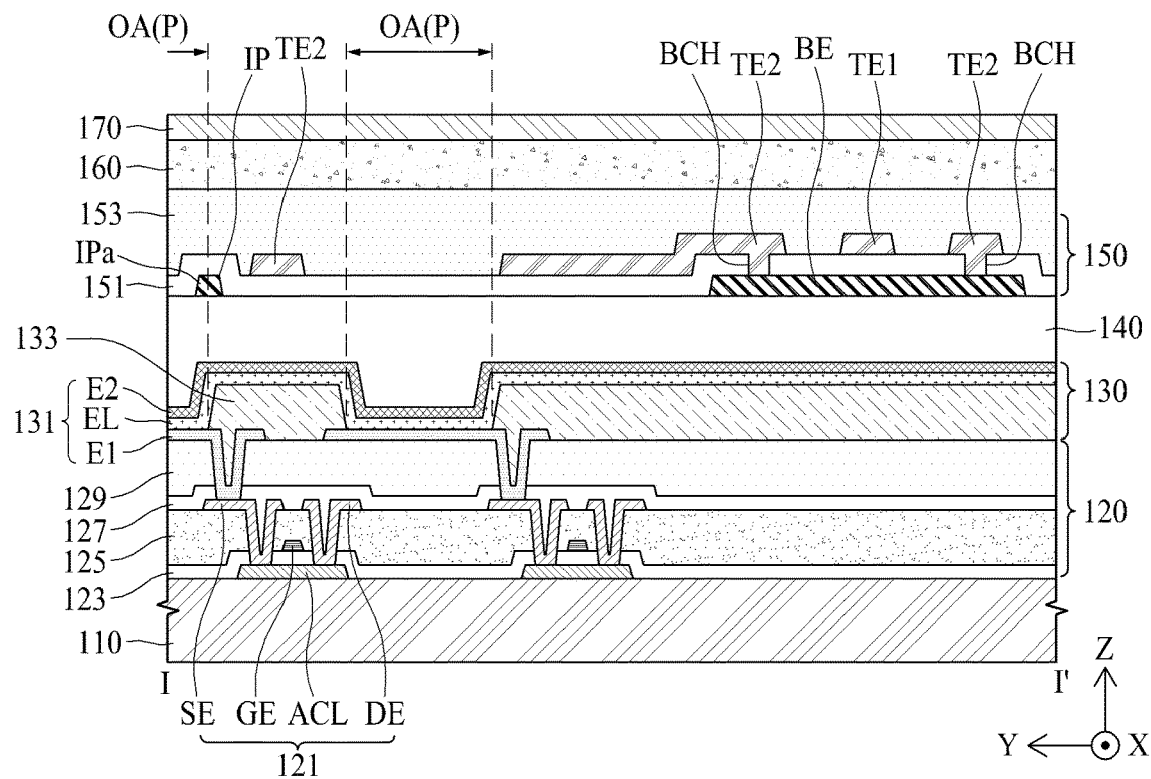
FIG. 4 is a cross-sectional view taken along line I-I' of FIG. 3.

FIG. 4 is a cross-sectional view of a display apparatus with integrated touch screen according to an aspect of the present disclosure and is a cross-sectional view taken along line I-I' of FIG. 3.

Referring to FIGS. 3 and 4, the display apparatus with integrated touch screen according to an aspect of the present disclosure may include a first substrate 110, a TFT layer 120, a light emitting device layer 130, an encapsulation layer 140, a touch electrode layer 150, an adhesive layer 160, and a second substrate 170.

A buffer layer may be formed on one surface of the first substrate 110. The buffer layer may be formed on the one surface of the first substrate 111, for protecting the TFT layer 120 and the light emitting device layer 130 from water penetrating through the first substrate 110 vulnerable to penetration of water. The one surface of the first substrate 110 may be a surface facing the second substrate 170. The buffer layer may be formed of a plurality of inorganic layers which are alternately stacked. For example, the buffer layer may be formed of a multilayer where one or more inorganic layers of silicon oxide (SiOx), silicon nitride (SiNx), and SiON are alternately stacked. The buffer layer may be omitted.

The TFT layer 120 may include a plurality of TFTs 121, a gate insulation layer 123, an interlayer insulation layer 125, a passivation layer 127, and a planarization layer 129. Here, the TFTs 121 illustrated in FIG. 4 may each be a driving TFT connected to the light emitting device layer 130.

The TFTs 121 may each include an active layer ACL, a gate electrode GE, a source electrode SE, and a drain electrode DE which are formed on the first substrate 110 or the buffer layer. In FIG. 4, each of the TFTs 121 are exemplarily illustrated as being formed in a top gate structure where the gate electrode GE is disposed on the active layer ACL, but is not limited thereto. That is, the TFTs 121 may be formed in a bottom gate structure where the gate electrode GE is disposed under the active layer ACL or a double gate structure where the gate electrode GE is disposed both on and under the active layer ACL.

The active layer ACL may be formed on the first substrate 110 or the buffer layer. The active layer ACL may be formed of a silicon-based semiconductor material, an oxide-based semiconductor material, and/or the like. A light blocking layer (not shown) for blocking external light incident on the active layer ACL may be formed between the buffer layer and the active layer ACL.

The gate insulation layer 123 may be formed to cover the active layer ACL. The gate insulation layer 123 may be formed of an inorganic layer, and for example, may be formed of SiOx, SiNx, or a multilayer thereof.

The gate electrode GE may be formed on the gate insulation layer 123 to overlap the active layer ACL. The gate electrode GE may protrude from a scan line provided on the gate insulation layer 123 to overlap the active layer ACL. The gate electrode GE and the scan line may each be formed of a single layer or a multilayer which includes one of molybdenum (Mo), aluminum (Al), chromium (Cr), gold (Au), titanium (Ti), nickel (Ni), neodymium (Nd), and copper (Cu), or an alloy thereof.

The interlayer insulation layer 125 may be formed on the gate electrode GE and the scan line. The interlayer insulation layer 125 may be formed of an inorganic layer, and for example, may be formed of SiOx, SiNx, or a multilayer thereof.

The source electrode SE and the drain electrode DE may be formed on the interlayer insulation layer 125 to overlap the active layer ACL with the gate electrode GE therebetween. In addition to the source electrode SE and the drain electrode DE, a data line may be formed on the interlayer insulation layer 125. Each of the source electrode SE and the drain electrode DE may be connected to the active layer ACL through a contact hole which passes through the gate insulation layer 125 and the interlayer insulation layer 123. The source electrode SE, the drain electrode DE, and the data line may each be formed of a single layer or a multilayer which includes one of Mo, Al, Cr, Au, Ti, Ni, Nd, and Cu, or an alloy thereof.

The passivation layer 127 may be formed to cover the source electrode SE, the drain electrode DE, and the data line. The passivation layer 127 may insulate the TFTs 121. The passivation layer 127 may be formed of an inorganic layer, and for example, may be formed of SiOx, SiNx, or a multilayer thereof.

The planarization layer 129 may be formed to cover the passivation layer 127. The planarization layer 129 may planarize a step height of an upper surface of the passivation layer 127 caused by the TFTs 121. The planarization layer 129 may be formed of an organic layer such as acryl resin, epoxy resin, phenolic resin, polyamide resin, polyimide resin, or the like.

The light emitting device layer 130 may be formed on the TFT layer 120. The light emitting device layer 130 may include a light emitting device 131 and a bank 133.

The light emitting device 131 and the bank 133 may be formed on the planarization layer 129.

The light emitting device 131 according to an aspect of the disclosure may emit light by a light emitting layer EL emitting light based on a data signal supplied from the driving TFT 121 of the TFT layer 120. The light emitting device 131 may include a first electrode E1, a light emitting layer EL, and a second electrode E2. The first electrode E1 may be an anode electrode, and the second electrode E2 may be a cathode electrode.

The first electrode E1 may be formed on the planarization layer 129. The first electrode E1 may be connected to the source electrode SE of the TFT 121 through a contact hole which passes through the passivation layer 127 and the planarization layer 129. The first electrode E1 may include a metal material, which is high in reflectivity. For example, the first electrode E1 may be formed in a multilayer structure such as a stacked structure (Ti/Al/Ti) of Al and Ti, a stacked structure (ITO/Al/ITO) of Al and ITO, an APC (Ag/Pd/Cu) alloy, or a stacked structure (ITO/APC/ITO) of an APC alloy and ITO, or may include a single-layer structure including one material or two or more alloy materials selected from among Ag, Al, Mo, Au, Mg, calcium (Ca), and barium (Ba).

The bank 133 may be formed on the planarization layer 250 to cover an edge of the first electrode E1 and may provide an opening area OA on the first electrode E1. The bank 133 may be disposed between first electrodes E1 of adjacent pixels P and may act as a pixel defining layer which defines an opening area OA of each of a plurality of pixels P.

The light emitting layer EL may be formed to cover the first electrode E1 and the bank 133 and may be a common layer which is provided in common in the plurality of pixels P. The light emitting layer EL may include one of an organic light emitting layer, an inorganic light emitting layer, and a quantum dot light emitting layer, or may include a stacked or mixed structure of an organic light emitting layer or an inorganic light emitting layer and a quantum dot light emitting layer.

The light emitting layer EL according to an aspect of the disclosure may include two or more light emitting parts for emitting white light. For example, the light emitting layer EL may include a first light emitting part and a second light emitting part for emitting the white light based on a combination of first light and second light. Here, the first light emitting part may emit the first light and may include one of a blue light emitting part, a green light emitting part, a red light emitting part, a yellow light emitting part, and a yellow-green light emitting part. The second light emitting part may include a light emitting part emitting light having a complementary color relationship among a blue light emitting part, a green light emitting part, a red light emitting part, a yellow light emitting part, and a yellow-green emitting part.

The second electrode E2 may be formed on the light emitting layer EL. The second electrode E2 may be formed to cover the light emitting layer EL. The second electrode E2 may be a common layer which is provided in common in the pixels P. The second electrode E2 according to an aspect of the disclosure may be formed of a transparent conductive material (or TCO), such as indium tin oxide (ITO) and indium zinc oxide (IZO) capable of transmitting light, or a semi-transmissive conductive material such as Mg, Ag, and an alloy of Mg and Ag. If the second electrode E2 is formed of a semi-transmissive conductive material, emission efficiency is enhanced by a micro-cavity. A capping layer may be formed on the second electrode E2.

The encapsulation layer 140 may be formed to surround the light emitting device layer 130. The encapsulation layer 140 prevents oxygen or water from penetrating into the light emitting layer EL and the second electrode E2. The encapsulation layer 140 according to an aspect may include at least one inorganic layer. The inorganic layer may be formed of silicon nitride, aluminum nitride, zirconium nitride, titanium nitride, hafnium nitride, tantalum nitride, silicon oxide, aluminum oxide, titanium oxide, and/or the like.

Optionally, the encapsulation layer 140 may further include at least one organic layer. The organic layer may be formed to have a sufficient thickness for preventing particles from penetrating into the light emitting layer EL and the second electrode E2 via the encapsulation layer 140.

The touch electrode layer 150 may be provided on an encapsulation layer 140. The touch electrode layer 150 according to an aspect may include a plurality of bridge electrodes BE, a plurality of identification patterns IP, an insulation layer 151, a plurality of first touch electrodes TE1, and a plurality of second touch electrodes TE2.

The bridge electrodes BE and the identification patterns IP may be provided on the encapsulation layer 140. That is, the bridge electrodes BE and the identification patterns IP may be provided on the same layer. The bridge electrodes BE and the identification patterns IP may be spaced apart from each other and may be electrically insulated from each other. In this case, the identification pattern IP may be electrically floated.

The bridge electrodes BE may be provided in an area between second touch electrode areas EA2 adjacent to each other in a second direction. The identification patterns IP may be provided in an area overlapping an outer portion (or an edge) of each of first touch electrodes TE1 and second touch electrodes TE2 adjacent to the sensing area SA, and all or some of the identification patterns IP may be directly exposed (or overlap) at the sensing area SA.

The bridge electrodes BE and the identification patterns IP may have a single-layer structure or a multilayer structure including a metal material. For example, the bridge electrodes BE and the identification patterns IP may each have a single-layer structure or a multilayer structure including a metal material such as Mo, Ag, Ti, Cu, Al, Ti/Al/Ti, and Mo/Al/Mo. The bridge electrodes BE and the identification patterns IP may be disposed to overlap the bank 133 so as to prevent the opening area OA of each pixel P from being reduced. However, some IPa of the identification patterns IP may overlap the opening area OA so as to be identified in an inspection and repair inspection process performed on the touch electrode layer 150.

The insulation layer 151 may be provided on the encapsulation layer 140 to surround the bridge electrodes BE and the identification patterns IP. A bridge contact hole BCH may be provided in the insulation layer 151 overlapping both edges of each of the bridge electrodes BE. The insulation layer 151 according to an aspect of the disclosure may be formed of an inorganic layer, and for example, may be formed of SiOx, SiNx, or a multilayer thereof.

The first and second touch electrodes TE1 and TE2 may be provided on the insulation layer 151 overlapping first and second touch electrode areas EA1 and EA2 which are previously provided. The first and second touch electrodes TE1 and TE2 may be provided on the same layer. The first and second touch electrodes TE1 and TE2 may be spaced apart from each other with the sensing area SA therebetween and may be electrically insulated from each other. Second touch electrodes TE2 spaced apart from each other in the second direction may be electrically connected to the bridge electrode BE through the bridge contact hole BCH. Therefore, since the second touch electrodes TE2 spaced apart from each other in the second direction are connected to each other through the bridge electrode BE, the first and second touch electrodes TE1 and TE2 may be insulated from each other in an intersection area of the first and second touch electrodes TE1 and TE2 without being short-circuited.

As described above, the first touch electrodes TE1 and the second touch electrodes TE2 may each include a mesh pattern where a plurality of metal lines ML having a very thin line width intersect one another.

Optionally, the touch electrode layer 150 according to an aspect of the disclosure may further include an overcoat layer 153 which covers the first touch electrodes TE1 and the second touch electrodes TE2.

The overcoat layer 153 may be provided to cover the first and second touch electrodes TE1 and TE2 and the insulation layer 151 and have a planar surface and a relatively thick thickness, thereby planarizing a step height caused by the electrodes of the touch electrode layer 150.

The display apparatus with integrated touch screen according to an aspect of the present disclosure may further include a black matrix and a wavelength conversion layer which are provided on the touch electrode layer 150.

The black matrix may define an opening area of each pixel P and may be provided on the overcoat layer 153 to overlap the bank 133.

The wavelength conversion layer may be provided in the opening area, defined by the black matrix, on the overcoat layer 153.

The wavelength conversion layer according to an aspect of the disclosure may include a color filter which transmits only a wavelength of a color, set in a pixel, of white light incident from the light emitting device 131 of each pixel P. For example, the wavelength conversion layer may transmit only a wavelength of red, green, or blue.

According to another aspect, the wavelength conversion layer 150 may include a quantum dot having a size which re-emits light based on the white light incident from the light emitting device 131 of each pixel P to emit light of a color set in a pixel. Here, the quantum dot may include one of CdS, CdSe, CdTe, ZnS, ZnSe, GaAs, GaP, GaAs—P, Ga—Sb, InAs, InP, InSb, AlAs, AlP, and AlSb. For example, a quantum dot including CdSe or InP may emit red light, a quantum dot including CdZnSeS may emit green light, and a quantum dot including ZnSe may emit blue light. In this manner, if the wavelength conversion layer includes the quantum dot, a color reproduction rate increases.

According to another aspect of the disclosure, the wavelength conversion layer may include a color filter including a quantum dot.

In the aspect of the disclosure where the wavelength conversion layer is provided, the light emitting device layer 130 may be provided in common in each pixel P, and thus, a manufacturing process is simplified.

If a light emitting layer EL of the light emitting device 131 includes a light emitting layer emitting red, green, and blue lights, the wavelength conversion layer may be omitted.

Moreover, the black matrix and the wavelength conversion layer may be disposed between the encapsulation layer 140 and the touch electrode layer 150.

The adhesive layer 160 may attach the second substrate 170 on the first substrate 110 on which the TFT layer 120, the light emitting device layer 130, the encapsulation layer 140, and the touch electrode layer 150 are provided. That is, the adhesive layer 160 may be provided on the touch electrode layer 150 (or the black matrix and the wavelength conversion layer) and may be attached on the second substrate 170. The adhesive layer 160 according to an aspect may be an OCR layer, an OCA film, or the like.

The second substrate 170 may be attached on the first substrate 110 by the adhesive layer 160 to protect a structure provided on the first substrate 110. The second substrate 170 may act as a cover substrate or a cover window, which covers the first substrate 110. The second substrate 170 may be a plastic film, a glass substrate, an encapsulation film (a protective film), or the like.

In the display apparatus with integrated touch screen according to an aspect of the present disclosure, the identification patterns IP may be provided in an outer portion of each of the first and second touch electrodes TE1 and TE2 adjacent to the sensing area SA, and all or some of the identification patterns IP may be exposed at the sensing area SA, whereby a pattern inspection and repair process is quickly performed on the touch electrodes having the complicated metal mesh structure.

Figure 5:
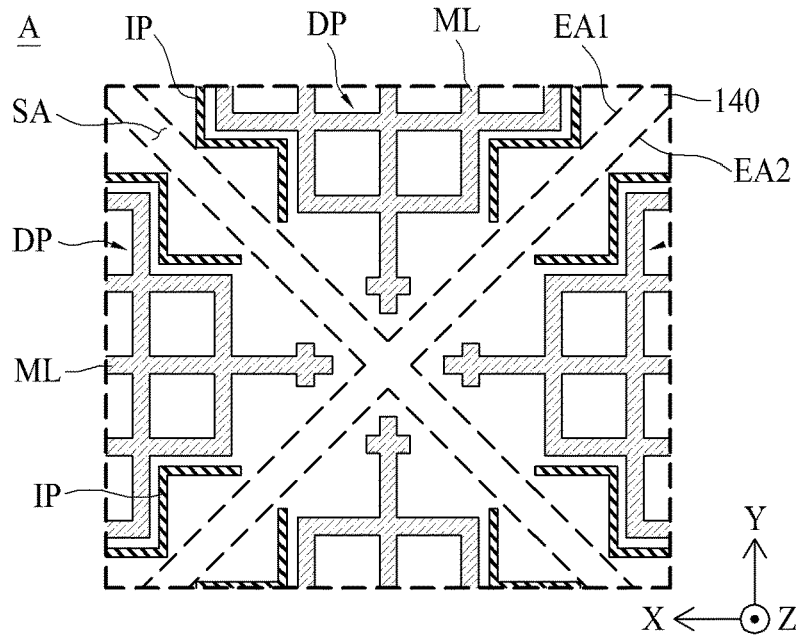
FIG. 5 is another enlarged view of a portion A illustrated in FIG. 2.

FIG. 5 is another enlarged view of a portion A illustrated in FIG. 2 and illustrates a dummy electrode additionally provided on the touch electrode layer illustrated in FIGS. 1 and 2.

Referring to FIGS. 2 to 5, a plurality of dummy patterns DP according to an aspect of the present disclosure may be provided on the same layer as the bridge electrodes BE and the identification patterns IP. That is, the dummy patterns DP may be directly provided on the encapsulation layer 140 along with the bridge electrodes BE and the identification patterns IP.

The dummy patterns DP may be spaced apart and electrically insulated from the bridge electrodes BE and the identification patterns IP. In this case, the dummy patterns DP may not electrically be connected to any electrode provided on the touch electrode layer 150 and may be electrically floated.

The dummy patterns DP may be formed along with the bridge electrodes BE and the identification patterns IP, and thus, may be formed of the same material as that of the bridge electrodes BE and the identification patterns IP. Particularly, the dummy patterns DP may overlap the first touch electrodes TE1 and the second touch electrodes TE2. That is, like the first touch electrodes TE1 and the second touch electrodes TE2, the dummy patterns DP may each include a mesh metal structure where a plurality of metal lines ML having a very thin line width intersect one another. In this case, a metal line ML of the dummy patterns DP may be equal to or smaller than the metal line ML configuring each of the first and second touch electrodes TE1 and TE2.

The dummy patterns DP according to the present aspect prevent the bridge electrodes BE from being over-etched in a process of patterning the bridge electrodes BE. That is, in a case where the dummy patterns DP is formed in a three-layer structure of Ti/Al/Ti, since an etch rate of an Al layer based on an etch gas or an etchant in a process of patterning the dummy patterns DP is higher than an etch rate of a Ti layer, the Al layer can be over-etched in comparison with the Ti layer, and an over-etched area of the Al layer may be provided in a reverse taper shape. Particularly, if only the bridge electrodes BE are formed on the encapsulation layer 140 as in FIG. 3, a side surface of the Ti layer is easily etched. Therefore, even when the insulation layer 151 is provided on the bridge electrodes BE, a void is formed in the over-etched area, and due to this, the first touch electrodes TE1 intersecting the bridge electrode BE provided on the insulation layer 151 is short-circuited with the bridge electrode BE through the void.

Therefore, in order to prevent the bridge electrodes BE from being over-etched in a process of patterning the bridge electrodes BE, the dummy patterns DP according to the present aspect may overlap the first touch electrodes TE1 and the second touch electrodes TE2 and may be provided adjacent to the bridge electrodes BE to have the same metal mesh structure. Accordingly, in the present aspect, the bridge electrodes BE may be provided as a plurality of electrode layers where different metal materials having different etch rates with respect to an etching material used in an etching process are stacked, thereby solving a problem where a side surface of one of the plurality of electrode layers is over-etched in comparison with the other electrode layers, and thus, the electrode layers are formed in a reverse taper shape. As a result, in the present aspect, a void uncovered by the insulation layer 151 is prevented from occurring due to over-etched electrode layers of electrode layers of the bridge electrodes BE, and thus, the first touch electrodes TE1 intersecting the bridge electrode BE provided on the insulation layer 151 is prevented from being short-circuited with the bridge electrode BE through the void.

In the present aspect, the identification patterns IP may be connected to the dummy patterns DP. That is, in a case where the dummy patterns DP are provided to overlap the first touch electrodes TE1 and the second touch electrodes TE2 and identification patterns IP other than some IPa of the identification patterns IP overlapping the sensing area SA are provided to overlap the first touch electrodes TE1 and the second touch electrodes TE2, some of the dummy patterns DP may overlap the sensing area SA, and in this case, the identification patterns IP may be some of the dummy patterns DP overlapping the sensing area SA. In other words, since the identification patterns IP and the dummy patterns DP are simultaneously formed through the same process, some of the dummy patterns DP may be exposed at the sensing area SA along outer portions of the first touch electrodes TE1 and the second touch electrodes TE2, may prevent the bridge electrode BE from being over-etched, and may act as the identification patterns IP.

Figure 6:
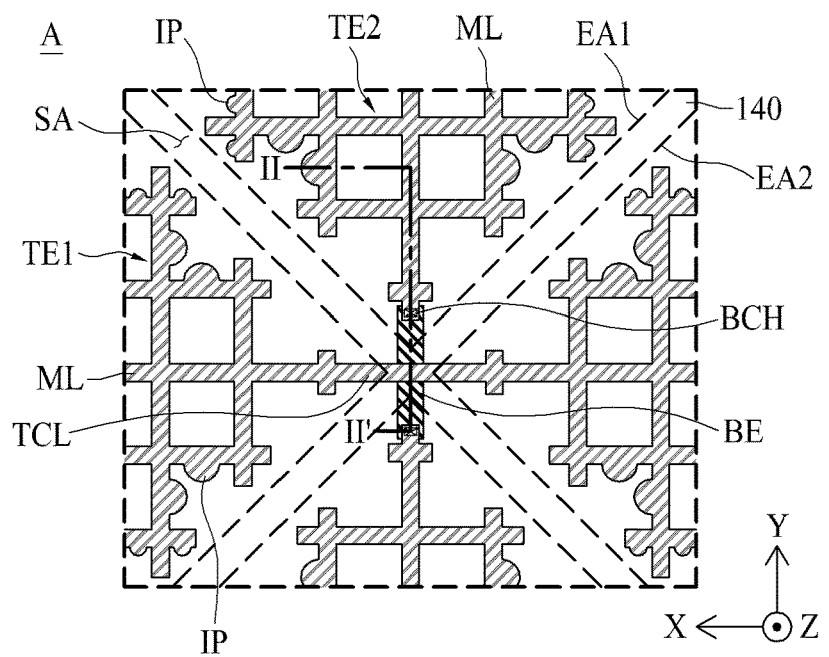
FIG. 6 is yet another enlarged view of a portion A illustrated in FIG. 2.
Figure 7:
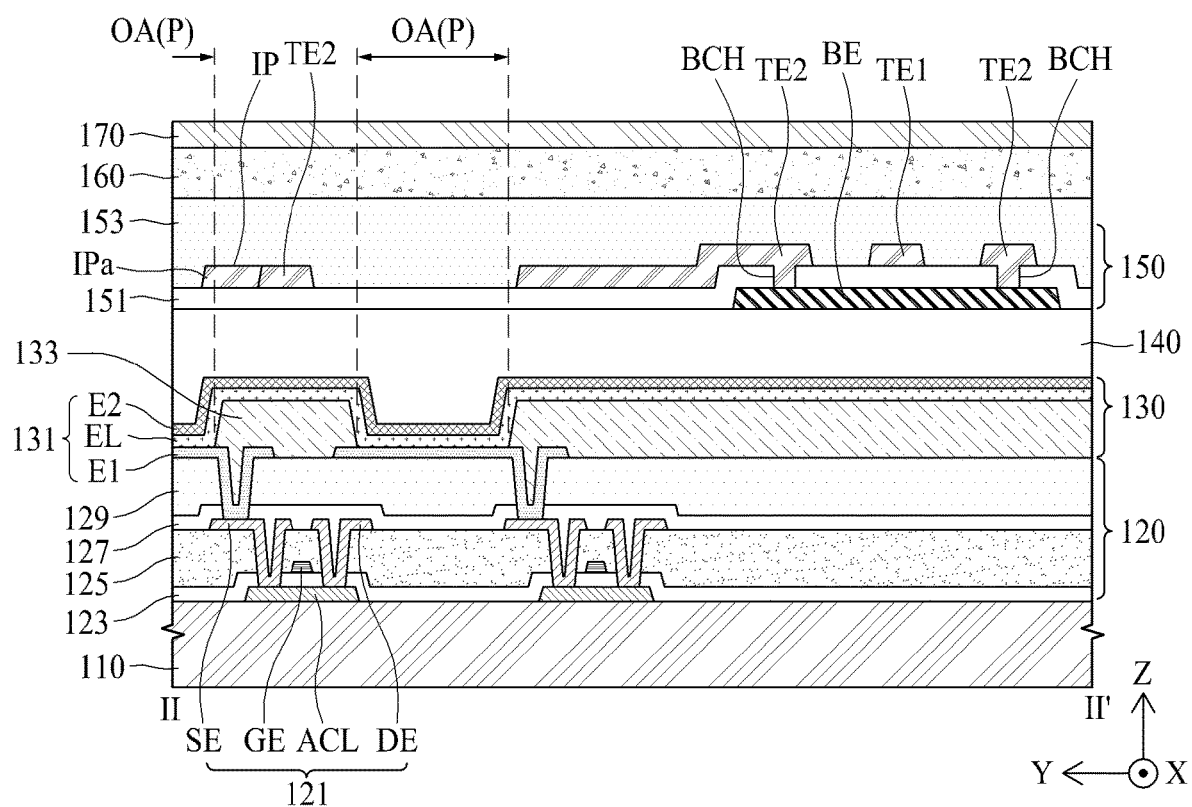
FIG. 7 is a cross-sectional view taken along line II-II' of FIG. 6.

FIG. 6 is another enlarged view of a portion A illustrated in FIG. 2; and FIG. 7 is a cross-sectional view taken along line II-II' of FIG. 6. FIGS. 6 and 7 illustrate an example which is configured by modifying identification patterns. Hereinafter, therefore, only identification patterns and elements relevant thereto will be described, and overlapping description of the same element is omitted or will be briefly given.

Referring to FIGS. 6 and 7, a plurality of identification patterns IP according to the present aspect may protrude from a metal line ML disposed in an outer portion (or an edge) of each of first touch electrodes TE1 and second touch electrodes TE2 adjacent to a sensing area SA.

For example, some IPa of the identification patterns IP protruding from the metal line ML may be exposed (or overlap) at the sensing area SA. The identification patterns IP according to an aspect of the disclosure may protrude to have a shape which differs from a shape of an end of the metal line ML configuring each of the first touch electrodes TE1 and the second touch electrodes TE2, so as to be clearly distinguished from a mesh pattern structure of each of the first touch electrodes TE1 and the second touch electrodes TE2.

For example, the identification patterns IP may be at least one protrusion which convexly protrudes from one side surface of the metal line ML adjacent to the sensing area SA to have a triangular shape or a curve shape such as a semicircular shape or a semielliptical shape. As another example, the identification patterns IP may be at least one concave portion which is concavely recessed from one side surface of the metal line ML adjacent to the sensing area SA to have a triangular shape or a curve shape such as a semicircular shape or a semielliptical shape.

Therefore, a pattern inspection and a repair process performed on touch electrodes may identify a special shape of only the identification patterns IP compared with a shape of a mesh pattern structure of each of the first touch electrodes TE1 and the second touch electrodes TE2, instead of colors of the identification patterns IP exposed at the sensing area SA and may detect the sensing area SA or a boundary portion between the first touch electrode TE1 and the second touch electrode TE2, whereby the pattern inspection and repair process are easily performed on touch electrodes having a complicated metal mesh structure.

Particularly, in the present aspect, one side surface of the metal line ML configuring each of the first touch electrode TE1 and the second touch electrode TE2 may protrude to the sensing area SA, and thus, the identification patterns IP may be formed. Accordingly, an area (or a length) of the outer portion of each of the first touch electrode TE1 and the second touch electrode TE2 increases more, and thus, a mutual capacitance generated in the sensing area SA between the first touch electrode TE1 and the second touch electrode TE2 increases more, thereby more enhancing touch sensing sensitivity.

Optionally, in the aspect of the disclosure, some IPa of the identification patterns IP protruding from the metal line ML may be provided to overlap only a bank 133 without being exposed (or overlapping) at the sensing area SA. In this case, the identification patterns IP may have a shape which differs from that of the metal line ML, and a pattern inspection and repair process performed on touch electrodes may identify a special shape of only the identification patterns IP compared with a shape of the metal line ML, instead of colors of the identification patterns IP. Accordingly, the identification patterns IP being exposed (or overlap) at the sensing area SA is not necessarily needed.

Additionally, in the aspect of the disclosure, a dummy pattern DP illustrated in FIG. 5 may be further provided, and in this case, the first touch electrodes TE1 intersecting a bridge electrode BE provided on an insulation layer 151 is prevented from being short-circuited with the bridge electrode BE through a void.

As described above, the present disclosure may provide a display apparatus with integrated touch screen, in which a pattern inspection and a repair process can be easily performed on touch electrodes having a complicated metal mesh structure.

In the display apparatus with integrated touch screen according to an aspect of the present disclosure, the touch electrode layer illustrated in one of FIGS. 1 to 7 may be configured as a separate touch screen panel. In this case, the touch screen panel may include a first transparent base member, a touch electrode layer provided on the first transparent base member, and a second base film attached on the touch electrode layer by an adhesive layer. The touch screen panel including the touch electrode layer according to an aspect of the present disclosure may be attached on the encapsulation layer 140 or a screen of a display panel by using an adhesive member.

The first transparent base member and the second base member may each be a film including one of polyethyleneterephthalate, polyethersulfone, polyimide, polynorbornene, polycarbonate, and polyethylenenaphthalate. Each of the adhesive layer and the adhesive member may be an OCR layer, an OCA film, or the like.

The touch screen panel according to an aspect of the present disclosure may be used as an input device for various products such as televisions (TVs), notebook computers, monitors, refrigerators, microwave ovens, washing machines, and cameras, in addition to portable electronic devices such as electronic organizers, e-books, portable multimedia players (PMPs), navigation devices, ultra-mobile personal computers (UMPCs), mobile phones, smartphones, smart watches, tablet personal computers (PCs), watch phones, and mobile communication terminals.

As described above, according to the aspects of the present disclosure, the identification patterns may be disposed outside each of the first touch electrodes and the second touch electrodes, thereby providing a touch screen panel and a display apparatus with integrated touch screen, in which a pattern inspection process and a repair process are easily performed on touch electrodes.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:
1. A touch screen panel comprising:
a plurality of first touch electrodes;
a plurality of second touch electrodes spaced apart from the plurality of first touch electrodes;
a sensing area disposed between the plurality of first touch electrodes and the plurality of the second touch electrodes;
a plurality of bridge electrodes electrically connecting the plurality of second touch electrodes; and
a plurality of identification patterns including an opaque metal material and being disposed in an outer portion of each of the plurality of first touch electrodes and the plurality of second touch electrodes, wherein the plurality of identification patterns are arranged at a gap space between each of the plurality of first touch electrodes and the plurality of second touch electrodes, wherein the plurality of identification patterns are arranged to identify a boundary portions between each of the plurality of first and second touch electrodes and the sensing area, wherein each of the plurality of first touch electrodes and the plurality of second touch electrodes includes a plurality of metal lines and each of the plurality of first touch electrodes and the plurality of second touch electrodes has a mesh pattern structure where the plurality of metal lines intersect one another, wherein a partial region of each of the identification patterns overlap with or intersect the plurality of metal lines in corresponding outer portions of the first touch electrodes and the second touch electrodes, wherein the plurality of identification patterns are electrically insulated from each of the plurality of first touch electrodes, the plurality of second touch electrodes, and the plurality of bridge electrodes, and wherein the plurality of identification patterns are disposed on a same layer as the plurality of bridge electrodes.

2. The touch screen panel of claim 1, wherein part of the plurality of identification patterns overlaps a metal line disposed in the outer portion of each of the plurality of first touch electrodes and the plurality of second touch electrodes.

3. The touch screen panel of claim 2, wherein each of the plurality of identification patterns has a line shape, a stepped shape, a dot line shape, or a curve shape.

4. The touch screen panel of claim 2, wherein each of the plurality of identification patterns has a line width narrower than the metal line.

5. The touch screen panel of claim 1, further comprising a plurality of dummy patterns provided on a same layer as the plurality of bridge electrodes and overlaps the plurality of first touch electrodes and the plurality of second touch electrodes.

6. The touch screen panel of claim 5, wherein the plurality of dummy patterns includes a plurality of metal lines and has a mesh pattern structure where the plurality of metal lines intersects one another.

7. The touch screen panel of claim 6, wherein the plurality of bridge electrodes, the plurality of identification patterns, and the plurality of dummy patterns each have a three-layer structure of titanium/aluminum/titanium or molybdenum/aluminum/molybdenum.

8. A touch screen panel comprising:
a plurality of first touch electrodes;
a plurality of second touch electrodes spaced apart from the plurality of first touch electrodes;
a sensing area disposed between the plurality of first touch electrodes and the plurality of the second touch electrodes and having a metal mesh structure;
a plurality of bridge electrodes electrically connecting the plurality of second touch electrodes; and
a plurality of identification patterns including an opaque metal material, and being disposed in an outer portion of each of the plurality of first touch electrodes and the plurality of second touch electrodes to identify the sensing area, wherein the plurality of identification patterns are arranged at a gap space between each of the plurality of first touch electrodes and the plurality of second touch electrodes, wherein the plurality of identification patterns are arranged to identify a boundary portions between each of the plurality of first and second touch electrodes and the sensing area, wherein each of the plurality of first touch electrodes and the plurality of second touch electrodes includes a plurality of metal lines and each of the plurality of first touch electrodes and the plurality of second touch electrodes has a mesh pattern structure where the plurality of metal lines intersect one another, wherein each of the plurality of identification patterns has at least one protrusion or concave portion on one side surface of a metal line disposed in an outer portion of each of the plurality of first touch electrodes and the plurality of second touch electrodes, and wherein the plurality of bridge electrodes and the plurality of identification patterns each have a three-layer structure of titanium/aluminum/titanium or molybdenum/aluminum/molybdenum.

9. The touch screen panel of claim 8, wherein the at least one protrusion protrudes from the one side surface of the metal line to have a curve shape or a triangular shape, or the at least one concave portion is concavely recessed from the one side surface of the metal line to have a curve shape or a triangular shape.

10. The touch screen panel of claim 8, further comprising a plurality of dummy patterns provided on a same layer as the plurality of bridge electrodes and overlaps the plurality of first touch electrodes and the plurality of second touch electrodes.

11. The touch screen panel of claim 10, wherein the plurality of dummy patterns includes a plurality of metal lines and has a mesh pattern structure where the plurality of metal lines intersects one another.

12. The touch screen panel of claim 11, wherein the plurality of dummy patterns each have a three-layer structure of titanium/aluminum/titanium or molybdenum/aluminum/molybdenum.

* * * * *